Oct. 25, 1932.  E. F. ROSSMAN  1,884,262

VALVE FOR SHOCK ABSORBERS

Filed May 19, 1930

Inventor

EDWIN F. ROSSMAN

By Spencer, Hardman and Feher
His Attorneys

Patented Oct. 25, 1932

1,884,262

UNITED STATES PATENT OFFICE

EDWIN F. ROSSMAN, OF DAYTON, OHIO, ASSIGNOR TO DELCO PRODUCTS CORPORATION, OF DAYTON, OHIO, A CORPORATION OF DELAWARE

VALVE FOR SHOCK ABSORBERS

Application filed May 19, 1930. Serial No. 453,621.

This invention relates to improvements in hydraulic valves for shock absorbers.

It is among the objects of the present invention to provide a compound valve mechanism for a hydraulic shock absorber, of simple structure and design, capable of being produced commercially at a minimum expenditure of time and material.

Another object of the present invention is to simplify the shock absorber by providing it with a unitary intake and pressure release valve.

Further objects and advantages of the present invention will be apparent from the following description, reference being had to the accompanying drawing wherein a preferred embodiment of one form of the present invention is clearly shown.

Figure 1:
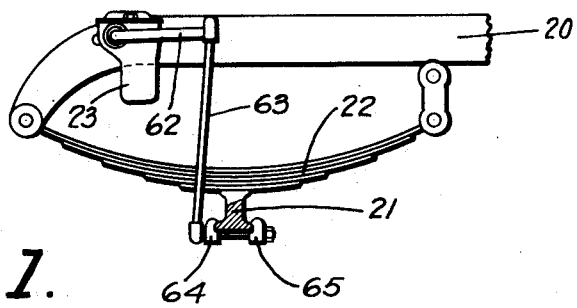
Fig. 1 is a fragmentary side view of a vehicle chassis having a shock absorber embodying the present invention applied thereto. The road wheels of the vehicle have been omitted for the sake of clearness.
Figure 2:
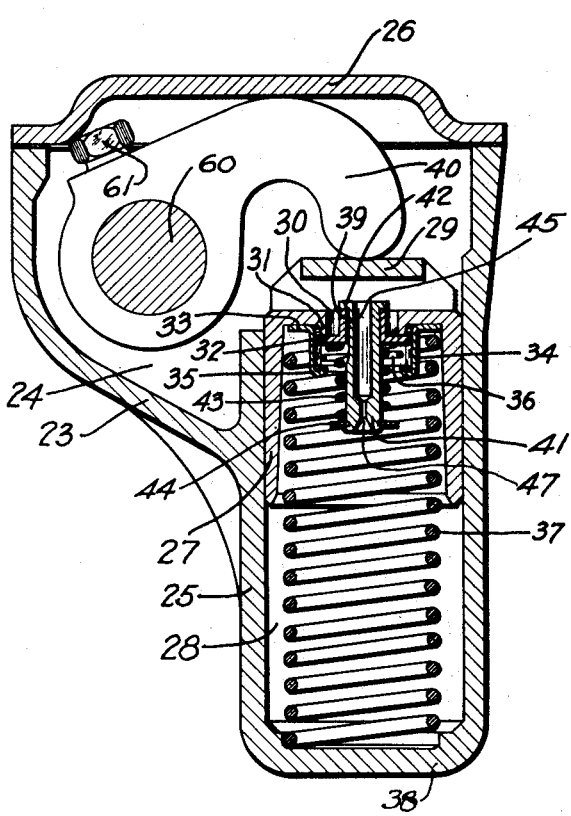
Fig. 2 is a vertical sectional view taken through the shock absorber.

Referring to the drawing, the numeral 20 designates the frame of the vehicle supported on the vehicle axle 21 by springs 22.

The shock absorber comprises a casing 23 presenting a fluid reservoir 24 and a cylinder 25. A cover cap 26 provided with a gasket, seals the upper, open end of the shock absorber.

Within the cylinder 25 there is provided a piston 27 which forms the compression chamber 28 in the cylinder. In the head of the piston there is provided a wearpiece 29. A passage 30 in the head of the piston provides for the transfer of fluid from one side of the piston to the other, or, from the fluid reservoir into the compression chamber and vice versa. In the inner wall of the piston head and surrounding passage 30 there is provided a ridge 31 forming a valve-seat.

The flow of fluid through passage 30 is controlled by a unitary valve mechanism comprising an intake valve and a pressure relief valve. The intake valve comprises a tubular portion 39 having an annular flange 32 which engages the valve-seat 31 to close the passage 30. A valve-cage comprising an annular ring portion 33 has angular arms 34 arranged in a circular row and in spaced relation, the ends of said angular arms being hook-shaped as at 35. In these hook-shaped ends of the angular arms 34 one end of the spring 36 is seated, the other end of said spring engaging the annular ring portion 32 of the intake valve, yieldably urging said valve into engagement with the valve-seat 31. The valve-cage is maintained in engagement with the inner wall of the piston head by a spring 37 which rests upon the bottom wall 38 of the cylinder 25, this spring not only maintaining the valve-cage against the piston, but also maintaining the piston against the rocker arm 40 which is adapted to operate the piston in one direction.

The pressure release valve comprises a tubular member 41 slidably supported within the tubular portion 39 of the intake valve. At one end of this pressure release valve there is provided an annular flange 42 which engages with the end face of the tubular portion 39 of the intake valve and is yieldably maintained in this engagement by a spring 43 interposed between the intake valve portion 32 and a collar 44 fitting into an annular groove provided in the end of the pressure release valve 41. A channel 45, provided in the outer surface of the pressure release valve 41 and extending from the inner edge of its annular flange 42 substantially midway of the valve, is adapted to provide a fluid passage between the fluid intake valve and the pressure release valve under certain conditions, which will be explained.

The longitudinal passage through the tubular valve 41 is reduced as at 47, presenting an orifice which controls the flow of fluid through said valve 41.

Figure 3:
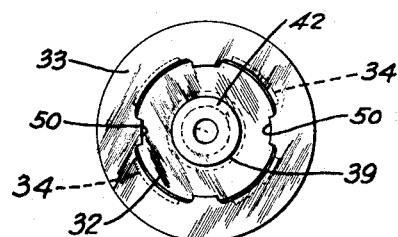
Fig. 3 is a plan view of the intake and pressure release valve unit.
Figure 4:
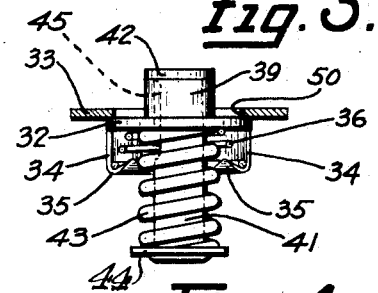
Fig. 4 is a detail side view of the valve unit, a portion thereof being shown in section more clearly to illustrate interior structures.
Figure 5:
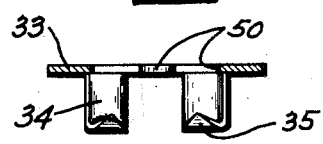
Fig. 5 is a sectional view of the valve cage.

As shown in Figs. 3 and 4, the annular flange or ring portion 33 of the valve cage has lugs 50 extending radially inwardly and are so spaced that the intake valve may be inserted edgewise into the valve cage, however, when the intake valve assumes a flat position relative to the valve cage as shown in Fig. 4, these lugs 50 will prevent removal of the valve from the cage and thus the intake valve and its spring 36 may be assembled into the valve-cage previous to the insertion of the valve mechanism into the piston. The assembling of the intake valve in the valve cage of course includes the pressure release valve 41 inasmuch as this valve is supported within the tubular portion 31 of the intake valve.

A rocker shaft 60 is rotatably supported by the casing 33 and has the rocker arm 40 attached thereto by a set screw 61. The rocker shaft 60 extends outside the casing and has a shock absorber operating arm 62 provided thereon, the free end of which is swivelly connected with a link 63, the opposite end of which is swivelly connected with a bracket 64. This bracket is attached to the axle 21 by a clamping member 65.

Striking an obstruction in the roadway the vehicle wheels, not shown, will urge axle 21 upwardly toward the frame 20, thereby compressing springs 22 and causing link 63 to move the shock absorber operating arm 62 and its rocker shaft 60 counter-clockwise. This will move the rocker arm 40 in a similar direction and thus spring 37 urges the piston 27 upwardly in its cylinder 25 to follow the counter-clockwise movement of the rocker arm 40. Fluid pressure within the reservoir 24, being exerted through the passage 30 in the piston head, will move the intake valve so that its portion 32 will be moved from engagement with the valve seat 31 and consequently there will be established a substantially free flow of fluid from the reservoir through the passage 30 past the intake valve into the cylinder, or more specifically into the space 28 which may be termed the compression chamber.

As soon as the spring 22 has reached the limit of its compression, due to this particular bump in the road being struck, it will return toward normal load position, thereby causing the link 63 to operate the shock absorber in a clockwise direction, thus rocker arm 40 will push the piston downwardly, into its cylinder 25 and thereby exerting pressure upon the fluid thereon. The initial flow from the compression chamber 28 into the reservoir 24 will be through the tubular valve 41, this flow being substantially restricted by the orifice 47, thus resisting the downward movement of the piston by the rocker arm 40 and consequently the return movement of the spring toward normal load position. If the rebounding movement of the spring is comparatively great, the orificed passage through the valve 41 will not be able to relieve the pressure in the compression chamber and thus the excessive pressure therein will urge the valve 41 against the effect of the spring 43 so that the valve flange 42 will be moved out of engagement with the end of the tubular portion 39 of the intake valve, thereby exposing the longitudinal groove 45 in the pressure release valve and thus establishing an additional, restricted flow between the intake and pressure release valves from the compression chamber 28 through the passage 30, into the reservoir and thus relieving the excessive pressure in said cylinder.

In the present instance applicant has provided a unitary valve mechanism for controlling the flow of fluid through the piston passage in both directions, said valve mechanism comprising two valves, one supported directly upon the other, both of these valves moving as a unit to establish the intake flow into the cylinder, one valve moving relative to the other to establish a restricted overflow of fluid from the compression chamber or cylinder.

Another feature of applicant's invention is that the entire valve mechanism may first be assembled as a unit and then placed in the piston, thereby greatly facilitating assembling of the device and thus substantially reducing manufacturing costs.

While the form of embodiment of the present invention as herein disclosed, constitutes a preferred form, it is to be understood that other forms might be adopted, all coming within the scope of the claims which follow.

What is claimed is as follows:

1. A fluid flow control device for a shock absorber comprising, in combination, a disc valve; a tubular valve supported by the disc valve; and a valve cage supporting said disc valve, said cage comprising a ring-shaped body portion, the inner peripheral edge having lugs, alternate ones extending radially in the plane of the body portion, the others being bent at angles to said body portion to form depending hook members; and a spring interposed between the hook members and the disc valve to urge the disc valve toward and against the radial lugs.

2. A fluid flow control device for a shock absorber comprising, in combination, a disc valve; a tubular valve supported by the disc valve; and a valve cage supporting said disc valve, said cage comprising a disc having its central portion perforated to provide angular, depending hook members and radially extending lugs substantially in the plane of the disc; and a spring interposed between the disc valve and the hook members, yieldably urging the disc valve into engagement with the lugs on the valve cage.

3. A fluid flow control device for a shock absorber comprising, in combination, a cage having a ring-shaped body portion with spaced, angular hook members extending from its inner peripheral edge; lugs extending radially from said edge; a valve in said cage, having a flanged, central opening; a spring in the cage, interposed between the hook members and valve, yieldably urging the valve against the lugs; a tubular valve slidably carried in the flanged opening of the first mentioned valve, said tubular valve having a head engaging the edge of the flange about said opening and a longitudinal slot in its outer surface terminating adjacent the inner edge of said head; and a spring about the tubular valve, one end secured to said valve, the other engaging the first mentioned valve.

4. A fluid flow control device for a shock absorber comprising, in combination, a cage consisting of a ring-shaped body portion, spaced portions of the inner edge being bent at an angle to said body portion to provide depending hook members, the portions of the said edge between the bent parts forming inwardly extending lugs; a tubular member having an outwardly extending annular flange providing a disc valve which is insertable into the cage edgewise through the space between diametrically opposite bent edges of the cage; a spring interposed between the hook members of the cage and the disc valve urging the valve flange against the lugs of the cage; a tubular valve in the tubular part of the disc valve, having a head engaging the edge of the said tubular part, the inner passage of the tubular valve being restricted, said tubular valve having an outside slot, one end of which is normally within the confines of the tubular portion of the disc valve; and a spring, one end of which engages a retainer secured to the tubular valve and the other engaging the disc valve.

In testimony whereof I hereto affix my signature.

EDWIN F. ROSSMAN.